United States Patent [19]

Wong et al.

[11] Patent Number: 4,679,078
[45] Date of Patent: Jul. 7, 1987

[54] HIGH SECURITY SUBSCRIPTION TELEVISION TRANSMISSION SYSTEM

[75] Inventors: Hoi W. Wong, Kowloon; Hung Y. Chai, Taikoo Shing, both of Hong Kong

[73] Assignee: Luks Industrial Company Ltd., Hong Kong

[21] Appl. No.: 723,882

[22] Filed: Apr. 16, 1985

Related U.S. Application Data

[63] Continuation-in-part of Ser. No. 552,077, Nov. 15, 1983, abandoned.

[51] Int. Cl.$^4$ ............................................. H04N 7/167
[52] U.S. Cl. ........................................ 380/15; 380/17; 380/20
[58] Field of Search ................. 358/120, 124, 122

[56] References Cited

U.S. PATENT DOCUMENTS

| | | | |
|---|---|---|---|
| 2,624,797 | 1/1953 | Lawson et al. | 358/145 |
| 3,313,880 | 4/1967 | Bass | 358/120 |
| 3,801,732 | 4/1974 | Reeves | 358/124 |
| 4,295,155 | 10/1981 | Jarger et al. | 358/120 |
| 4,353,088 | 10/1982 | Toonder | 358/124 |
| 4,396,947 | 8/1983 | Cheung | 358/124 |
| 4,398,215 | 8/1983 | Osaka | 358/124 |
| 4,429,331 | 1/1984 | Kanai | 358/124 |
| 4,527,195 | 7/1985 | Cheung | 358/120 |
| 4,575,755 | 3/1986 | Schoeneberger et al. | 358/124 |
| 4,590,519 | 5/1986 | Zelenz | 358/123 |

FOREIGN PATENT DOCUMENTS 1028025 5/1966 United Kingdom .

Primary Examiner—Stephen C. Buczinski
Attorney, Agent, or Firm—Poms, Smith, Lande & Rose

[57] ABSTRACT

A system for scrambling and descrambling a composite video signal having video program information, vertical sync pulses, and horizontal sync and blanking information includes an encoder and a decoder. The encoder scrambles the video signal by selectively biasing the horizontal information, selectively inverting the video program information and the non-biased horizontal information. The scrambled and nonscrambled portions of the video signal are modulated with data identifying the manner in which has been scrambled. The decoder detects the data identifying the manner of scrambling of the video program information. The decoder reinverts the sync by a fixed sequence which is triggered by normal sync. The decoder also selectively debiases the biased horizontal information, by a fixed sequence which is triggered by the normal sync, thereby producing the original composite video signal.

12 Claims, 4 Drawing Figures

HIGH SECURITY SUBSCRIPTION TELEVISION TRANSMISSION SYSTEM

This application is a continuation-in-part of application Ser. No. 552,077 filed Nov. 15, 1983, now abandoned.

FIELD OF THE INVENTION

The present invention relates generally to systems to prevent unauthorized utilization of video signals and, more particularly, to the dynamic scrambling and descrambling of composite video signals and to the transmission of data in both scrambled and nonscrambled signals.

BACKGROUND OF THE INVENTION

Subscription television and cable television are becoming increasingly popular. As a result of such increasing popularity, however, unauthorized use of the programming from these sources is becoming a very significant problem. Many systems have been proposed to scramble the television signals in various fashions to deter unauthorized utilization of the programming. Many of the systems currently employed either are overly complicated electrically such that the circuitry to reconstruct the signal is expensive, or are not sophisticated enough to deter unauthorized utilization of the television signals.

Prior art systems currently in use usually employ one of several standard techniques. One technique is to invert all of the video program information, along with the horizontal sync and blanking information present in a composite video signal. The disadvantage of this approach is that, for those skilled in video technology, such inversion is easy to detect and the signal can be easily reinverted, especially with the presence of the horizontal sync and blanking information.

Another technique employed is to transmit all of the horizontal sync and blanking pulses, but to randomly invert the video program information. This particular approach presents difficulties in accurately reconstructing the video signal and often results in a flickering picture.

Furthermore, in most subscription television or cable systems, data must often be transmitted to the subscriber's decoder to identify, for example, the types of programmaing to which the subscriber has subscribed and is thus entitled to view. Several techniques have been used to transmit such data. With one system, data is transmitted over unused horizontal scanning lines during the vertical blanking interval of the broadcast signal. As only a limited number of such lines are available, data is transmitted at a very high rate, requiring expensive high-speed digital devices in the decoder to accurately store and process this data.

Other techniques employ additional FM or audio subcarriers to transmit this data, also resulting in complicated transmission networks and additional circuitry in the decoder. These particular techniques are also restricted by available bandwidth, resulting in low-speed transmission.

No prior art system discloses or suggests a system which would allow the following functions to be performed simultaneously and independently: random inversion of the video program information, inversion of the horizontal blanking and sync information, and DC level biasing of the horizontal blanking and sync information. Furthermore, no prior art system discloses or suggests a system which would allow the continual transmission of data in a scrambled composite video signal which would provide a decoder with the necessary information to decode such a signal.

Accordingly, it is the principal object of the present invention to deter unauthorized utilization of a video signal.

Another object of the present invention is to allow the following operations to be performed simultaneously and independently in a composite video signal: random inversion of the video program information, biasing of the horizontal blanking and sync information, and inversion of the horizontal blanking and sync information.

Yet another object of the present invention is to effect high-speed digital data transmission in a scrambled composite video signal.

SUMMARY OF THE INVENTION

The present invention, in a broad aspect, provides a system for scrambling and unscrambling a composite video signal having video program information, vertical sync pulses, and horizontal sync and blanking information. The system includes an encoder which selectively biases the horizontal information in the signal, and which modulates the signal with data identifying the manner in which the composite video signal is being scrambled. The encoder also selectively inverts the video program information, selectively inverts the non-biased horizontal information and the modulated data to produce a scrambled and encoded video signal. The scrambled and encoded video signal is processed by a decoder which detects the data identifying the manner in which the video signal has been scrambled, and which selectively reinverts the video program information. The decoder reinverts the sync by a fixed sequence which is triggered by normal sync. The decoder also debiases the biased horizontal information by another fixed sequence which is also triggered by normal sync.

In accordance with the various features of the invention, the horizontal sync and blanking information are biased in a fixed sequence. The modulation of the data in the composite video signal can be done with pulse amplitide modulation, frequency modulation, frequency-shift keying, amplitude shift keying, phase shift keying, pulse width modulation or pulse position modulation. The inversion of the non-biased horizontal blanking and sync information, is done is a fixed sequence. The inversion of the video program information can be done in a fixed sequence, a random sequence, or a sequence based upon the mean level of color signal.

Other objects, features, and advantages of the present invention will become apparent from a consideration of the following detailed description and the accompanying drawings.

DETAILED DESCRIPTION

Figure 1:
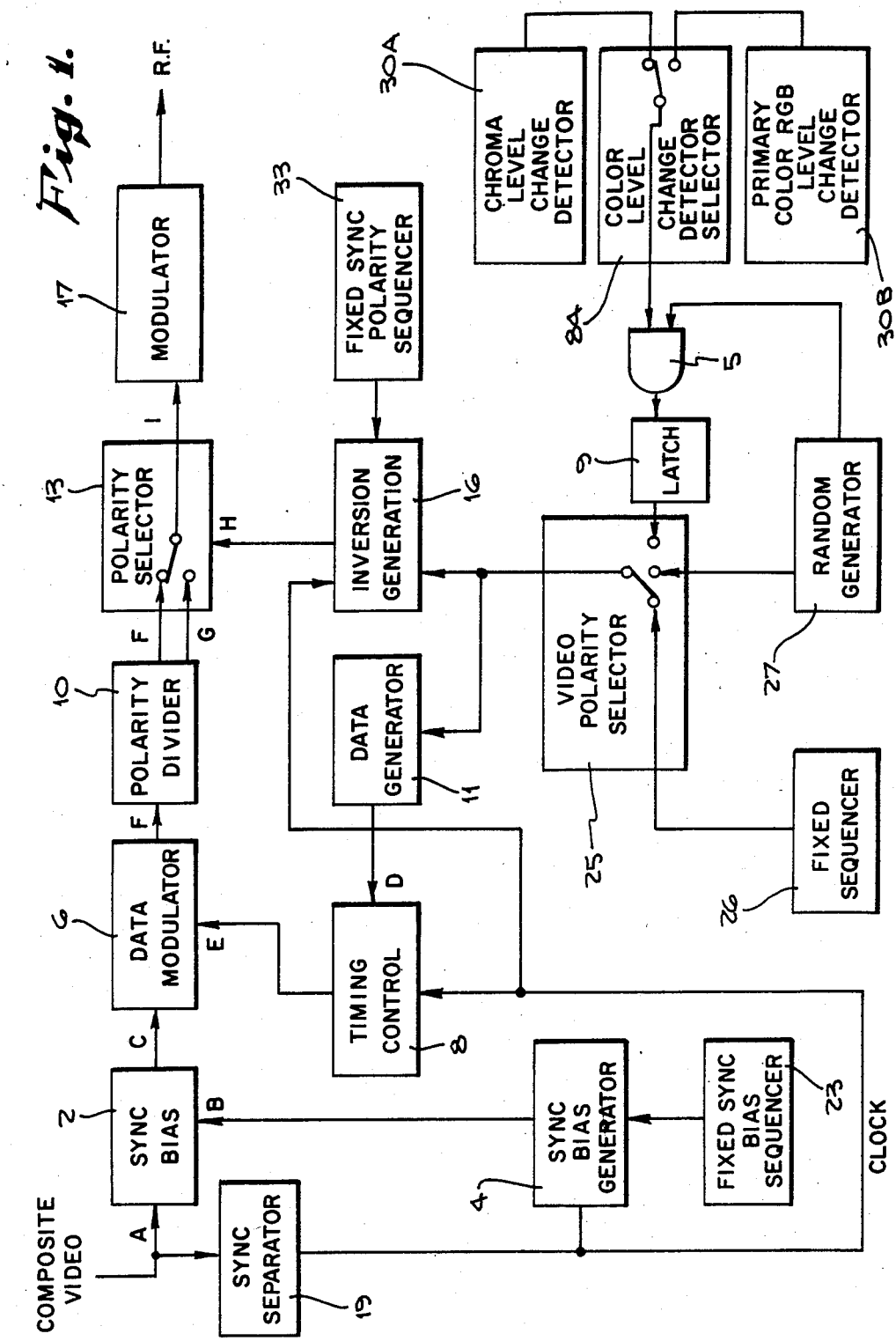
FIG. 1 shows a functional block diagram of the encoder portion of a system for dynamically scrambling and descrambling a composite video signal according to the present invention.
Figure 2:
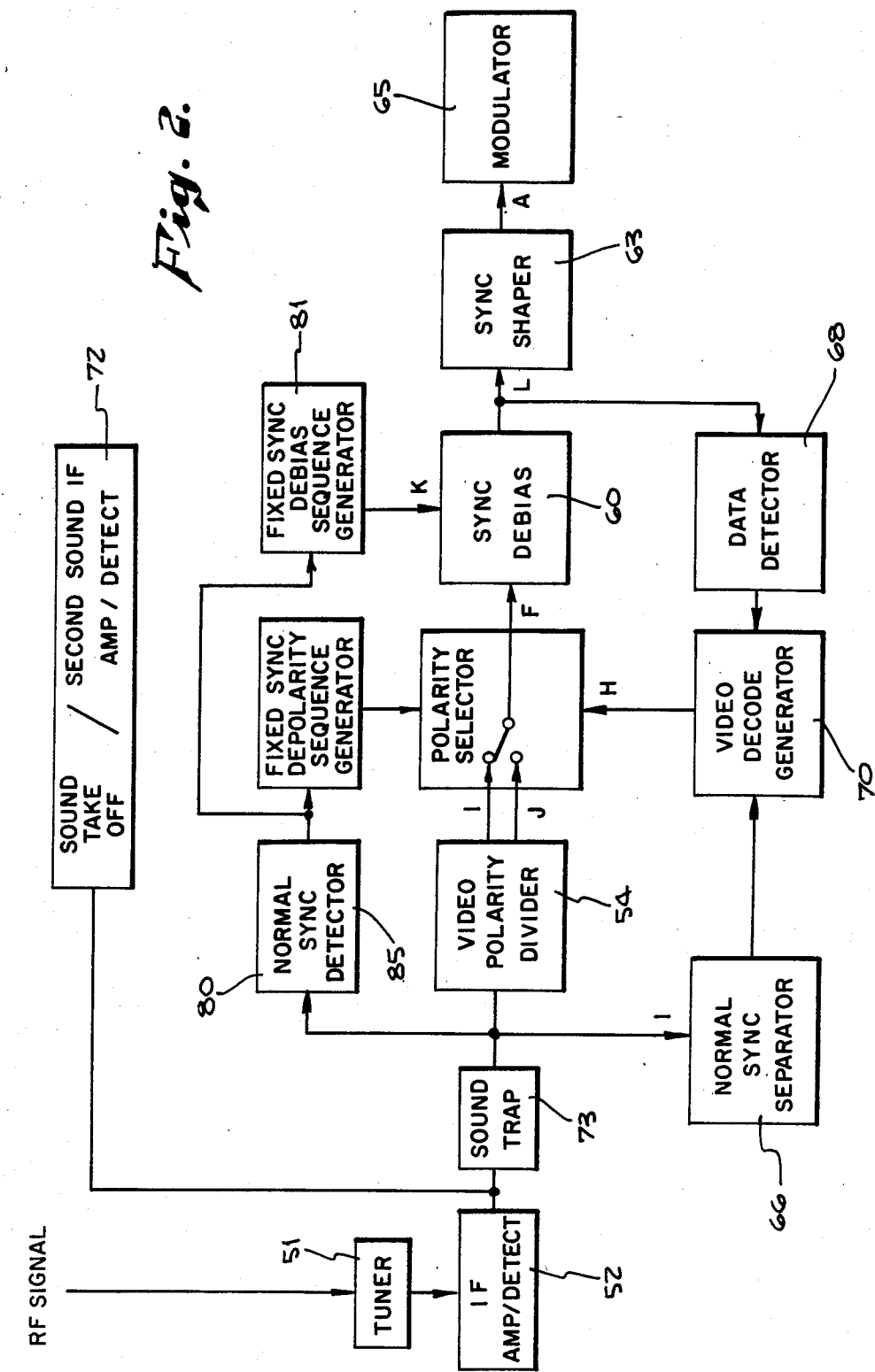
FIG. 2 shows a functional block diagram of the decoder portion of the present invention.
Figure 3:
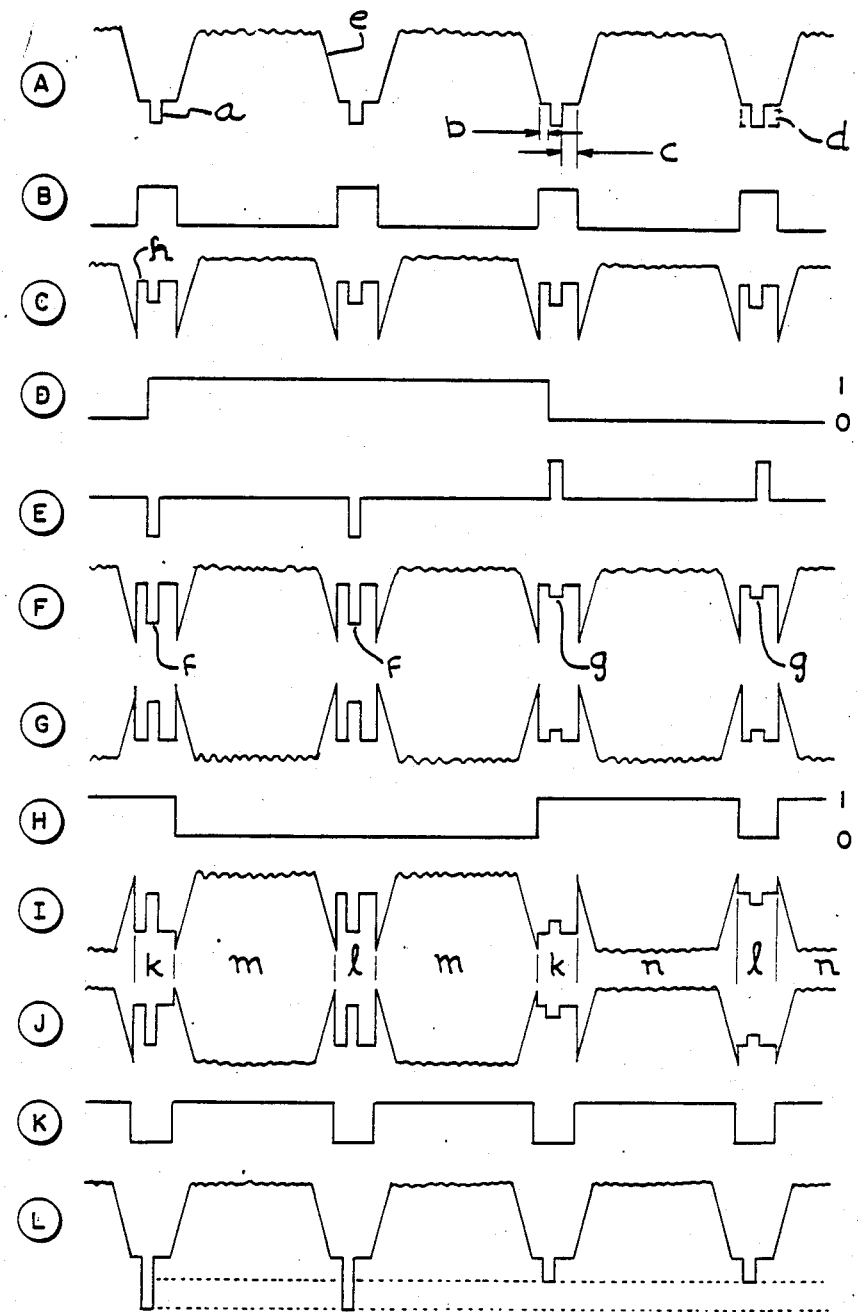
FIG. 3 shows the waveforms at selected locations in the encoder of FIG. 1 and the decoder of FIG. 2.

Referring more particularly to the drawings, the functional block diagrams of a system for dynamically scrambling and descrambling a composite video signal having video program information, vertical sync pulses, and horizontal sync and blanking signals are shown in FIGS. 1 and 2, respectively. The input and output waveforms for each of the blocks of the functional block diagrams in FIGS. 1 and 2 are shown in FIG. 3. With the input and output waveforms, one skilled in the art can easily design the circuitry of each block and, accordingly, the detailed circuitry of each block has not been provided herein.

Additionally, the composite video signals referred to herein contain the usual video and sync components of television signals as defined by the National Television Standards Committee (NTSC) and thus the use of the phrases "video program information" and "horizontal sync and blanking" and the like is meant to describe those characteristics and parameters as set forth in NTSC specifications and in the subsequent generally accepted revisions to and modifications of those specifications.

THE ENCODER

Turning first to a general overview of the encoder shown in FIG. 1, the encoder allows all of the following to be done simultaneously, and independently: random polarity inversion of the video information in a composite video signal, DC biasing of the horizontal blanking and sync information in a composite video signal, and polarity inversion of the nonbiased horizontal blanking and sync information.

Polarity inversion of the video program information is such that each scanning line, or each group of consecutive scanning lines, or each frame, is inverted according to a fixed sequence, or randomly, or in accordance with a detected level change of the color mean level information of each frame. Such inversion reduces any possibility of a flickering picture when the signal is descrambled.

Polarity inversion of the nonbiased horizontal blanking and sync information can be such that each pulse, or group of consecutive pulses, is inverted according to a fixed sequence. The difference between this technique and the prior art is that, in the present system, inversion of the nonbiased horizontal blanking and sync pulse information can occur independently of the video program information. With the independent inversion of the horizontal blanking and sync information, the resulting scrambled picture is much more difficult to receive by an ordinary television receiver, and is also much more difficult to decode.

The encoder also modulates the biased horizontal sync pulses to transmit data bits. This modulation can be done by: pulse amplitude modulation, frequency shift keying modulation, amplitude shift keying, phase shift keying, pulse width modulation pulse position modulation, by any combination thereof, or by any other conventional method of modulating digital signals. In practice, one data bit can be transmitted by one sync pulse. If, for example, 250 horizontal sync pulses out of every frame are modulated with data, then, at a frame rate of 60 frames per second, a data transmission rate of 15,000 bits per second can be achieved. One particular advantage of this is that only one data bit per scanning line is transmitted, which is slower than the prior art vertical blanking interval data transmission of 25 bits per line. Accordingly, the digital data receiving device in the decoder is much cheaper to manufacture and the data transmission is much more reliable.

Turning now to the particulars of the encoder shown in FIG. 1, a composite video signal as shown in FIG. 3A is connected to a Sync Bias circuit 2. "Sync Bias" as used herein means DC biasing of the whole horizontal blanking pulse including the horizontal sync pulse. The composite video signal shown in FIG. 3A includes video program information e, horizontal sync pulses a (typically 4.76 $\mu$s) having a front porch b (typically 1.59 $\mu$s) and a back porch c (typically 4.76 $\mu$s), and horizontal blanking pulses d.

The purpose of the Sync Bias circuit 2 is to selectively bias the horizontal sync and blanking pulses in the composite video waveform as shown in FIG. 3A. The Sync Bias circuit 2 does this by adding to the composite video waveform shown in FIG. 3A a series of pulses as shown in FIG. 3B which are generated by the Sync Bias Generator 4. The addition of the waveforms shown in FIGS. 3A and 3B is shown in FIG. 3C. The pulses in the waveform shown in FIG. 3B are each opposite polarity and larger amplitude than the horizontal sync pulses in the waveform shown in FIG. 3A. Consequently, the addition of the waveforms shown in FIGS. 3A and 3B produces what will be referred to herein as "synthetic" sync pulses as shown in FIG. 3C.

The Sync Bias Generator 4, which generates the waveform shown in FIG. 3B used by the Sync Bias circuit 2, is driven by a Fixed Sync Bias Sequencer 23. The Fixed Sync Bias Sequencer 23 generates a series of pulses designed to bias the horizontal information in a regular fashion.

The waveform shown in FIG. 3C with the synthetic sync pulses is modulated by a Data Modulator 6, which operates under control of a Timing/Control circuit 8. The Timing/Control circuit 8 has a data input as shown in FIG. 3D, containing data identifying the sequence in which the video signal is scrambled by the encoder.

The information shown in the waveform in FIG. 3D identifies the inversion sequences of the video signal. It can be generated by a computer circuit integral within or connected to the encoder.

The type of waveform generated by the Timing/Control circuit 8 to modulate the waveform shown in FIG. 3C depends on the modulation scheme employed. Pulse or amplitude modulation, pulse width modulation, frequency shift keying, pulse position modulation, or any combination thereof, can be used. The modulation scheme shown in FIG. 3 employs pulse amplitude modulation. Accordingly, the waveform shown in FIG. 3E has high and low going portions corresponding to whether the binary information shown in FIG. 3D is a logical ONE or a logical ZERO. The output of the Data Modulator 6 is shown in FIG. 3F. The portions of the synthetic sync signals h corresponding to the locations of the original horizontal sync pulses a have been increased or decreased in amplitude according to whether the binary information shown in FIG. 3D was a logical ONE or a ZERO. For those portions of FIG. 3D in which the binary information is a logical ONE, the portion of synthetic sync pulse h between the front and back porches has a region of lower amplitude f. Conversely, when the binary information shown in FIG. 3D is a logical ZERO, that portion of the synthetic sync pulse h has a region of higher amplitude g. The data input signal shown in FIG. 3D is controlled by the Timing/Control circuit 8 such that only the synthetic sync pulses, but not the video program information, is modulated.

The operation of the Timing/Control circuit 8 is synchronized to the composite video signal shown in FIG. 3A by Sync Separator 19. The Sync Separator 19 processes the composite video signal shown in FIG. 3A to remove from that signal the horizontal and vertical sync pulses which are used as a clock basis for the entire system.

The output of the Data Modulator 6 then passes to a Polarity Divider 10. The output of the Polarity Divider 10 is both the original signal entering the divider, as shown in FIG. 3F, plus the complete inverse of that signal, as shwon in FIG. 3G. Thus, the outputs of the Polarity Divider 10 are two signals which are equal in amplitude but opposite in polarity.

The outputs of the Polarity Divider 10 are connected to a a Polarity Selector 13 which operates under the control of an Inversion Generator 16. The Inversion Generator 16 produces a waveform as shown in FIG. 3H which determines whether the Polarity Selector 13 selects either the inverted or noninverted signals shown in FIGS. 3G and 3F, respectively. The output of the Polarity Selector 13 is the waveform shown in FIG. 3I. As shown in FIG. 3I, the waveform shown in FIG. 3G is selected when the waveform shown in FIG. 3H is a logical ONE and the waveform shown in FIG. 3F is selected when the waveform shown in FIG. 3H is a logical ZERO.

The waveform shown in FIG. 3I is the scrambled and encoded waveform produced by the encoder. The waveform shown in 3I has portions k corresponding to the inverted synthetic sync pulse h with the modulated data, portions I containing noninverted synthetic sync pulses, portions m containing noninverted video, and portions n containing inverted video. Not shown in FIG. 3I are those portions of the horizontal sync and blanking which have not been biased but which also are inverted or not inverted depending upon the waveform shown in FIG. 3H.

The waveform shown in FIG. 3I passes to a conventional RF modulator 17, where it is modulated in conventional fashion for television transmission over the air waves, or through a cable system.

The Inversion Generator 16, which provides the timing to switch between the inverted and noninverted waveforms shown in FIGS. 3G and 3F, is driven by a Fixed Sync Polarity Sequencer 33 and a Video Polarity Selector 25, which respectively select the sequences in which the horizontal information and video program information are to be inverted. The outputs from the Fixed Sync Polarity Sequencer 33 and the Video Polarity Selector 25 are combined by the Inversion Generator 16 to generate the control waveform shown in FIG. 3H. The Fixed Sync Polarity Sequencer 33 inverts the synthetic sync and non-biased horizontal information on a regular basis.

The Video Polarity Selector 25 performs the same function as the Fixed Sync Polarity Sequencer 33 with respect to inversion of the video program information originating in the composite video waveform as shown in FIG. 3A. The video polarity selector selectively chooses the output of a Fixed Sequencer 26, a Random Generator 27, or the combination of a Random Generator 27 and the color mean level change detector 30.

The data modulated onto the synthetic sync signals identifies the inversion sequence of the video program information. The Fixed Sequencer 26 requires inversion of the video program information in a fixed sequence. The Random Generator 27 requires inversion in a random sequence. The Color Mean Level Change Detector 30 base the determination of whether to invert the video program information by the mean of color level information between successive frames. To avoid providing an indication that inversion is being performed based upon these mean levels, an AND gate 5 and a latch 9 are used such that the effect of the mean inversion determination is randomly enabled and disabled by the Random Generator 27.

Figure 4:
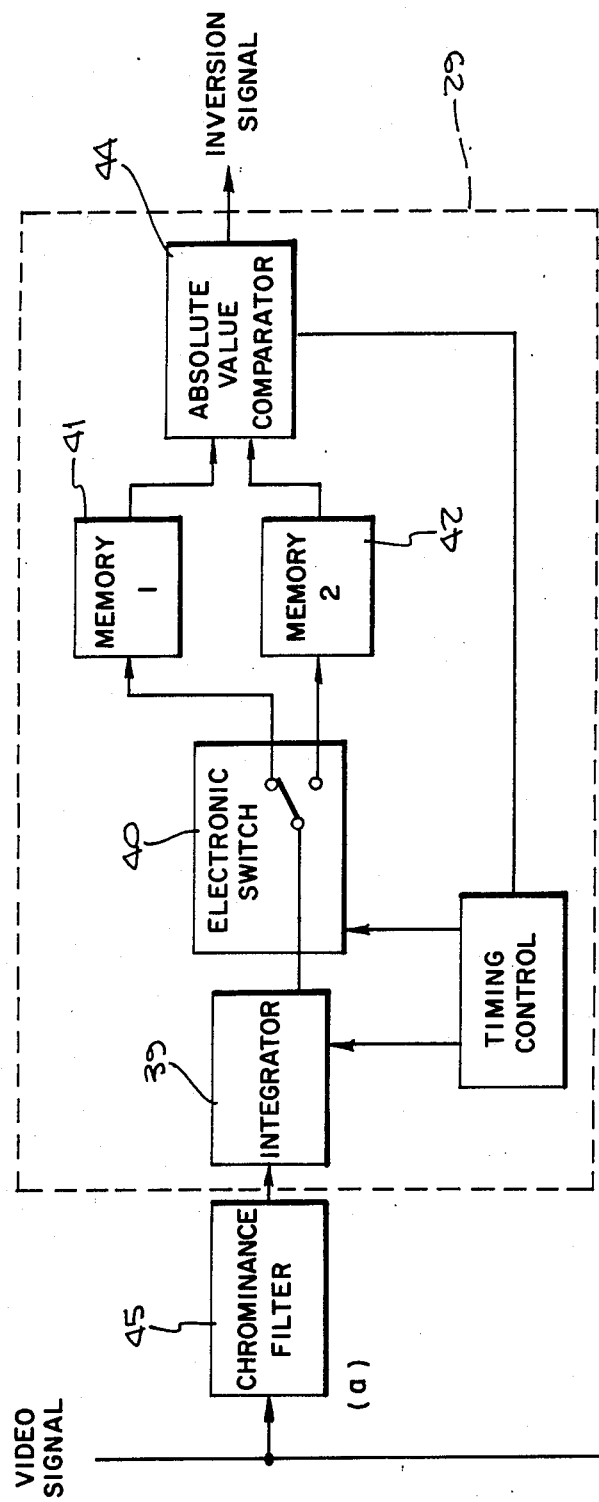
FIG. 4 shows two alternate functional block diagrams of color level change detectors which may be with the system of the present invention.
Figure 4:
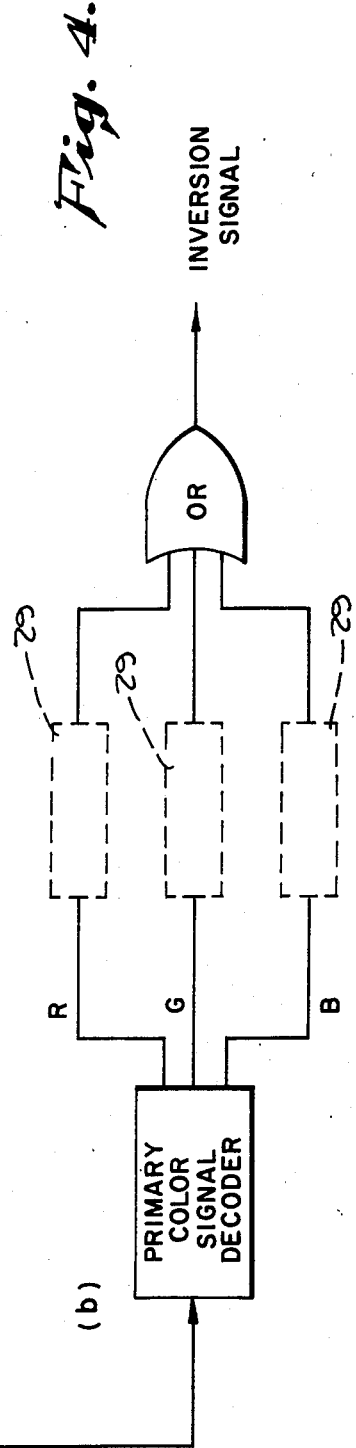

FIG. 4 shows the circuitry of the two alternate kinds of color level change detectors 30 in more detail. In FIG. 4(a), the video signal is passed through a chrominance band pass filter 45, the output of which is integrated by an Integrator 39. The integrated value over each frame is stored alternately via an electronic switch 40 into two memories 41 and 42. A Timing/Control circuit 43 activates the electronic switch and discharges the Integrator 39 at the end of each frame. The output from the two memories 41 and 42 is compared by an absolute value comparator 44 to obtain a positive value to feed to the AND gate 5. In FIG. 4(b), the video signal is passed through the R G B decoder. Then the three outputs are passed through an identical circuit to 29 in FIG. 4(a). The three outputs from the absolute value comparators are passed through an OR gate. Hence a positive pulse will generate if any of the R G B level is changed. As mentioned, basing the video program inversion on the detected level of change of the mean color level each frame reduces possible flickering of the picture during reinversion and recovery of the video picture.

THE DECODER

The decoder is shown in FIG. 2. The decoder unit reinverts the inverted video program information, synthetic sync signals, and the nonbiased horizontal information, as well as debiases the biased horizontal sync and blanking information, to produce the original composite video waveform supplied to the encoder.

The decoder first receives the RF signal transmitted by the encoder into a conventional tuner 51. The output of the Tuner 51 is connected to a conventional IF Amplifier/Detector 52, which provides a picture IF signal at 45.75 MHz, and a sound IF signal at 41.25 MHz. The output of the Amplifier/Detection 52 is passed to a Second Sound Take Off and Second Sound IF Amplifier/Detector 72. The Second Sound IF is 4.5 MHz and is beated from 45.75 MHz and 41.25 MHz. This output is modulated in a conventional modulator 65 to provide Channels 3 or 4. The output of the IF Amplifier/Detector 52 is also passed thorugh a Sound Tape 73 to eliminate any audio. The output of the Sound Tape 73 is waveform shown in FIG. 3I, which is the scrambled and encoded waveform produced by the encoder.

The output of the IF Amplifier/Detector 52 also drives, through the Sound Trap 73, a series of circuits which reinvert the video programming and horizontal information. The output of the IF Amplifier/Detector first drives a Video Polarity Divider 54 which, like the Polarity Divider 10 in the encoder, generates inverted and noninverted versions of this signal, as shown in FIG. 3J and 3I, respectively. These inverted and noninverted versions are supplied to a Polarity Selector 59, which selects one of them. When signals initially enter the decoder, the Polarity Selector will be set to detect the noninverted signal. The output of the Polarity Selector 59 drives a Sync Debias circuit 60, which is connected to a Data Detector 68, detects the information encoded in the scrambled and encoded video waveform indicating the manner in which the video program information has been inverted. The output of the Data Detector 68 drives a Video Decode Generator 70. The outputs of the Video Decode Generator 70 and the Fixed Sync Depolarity Sequence Generator 80 are coupled to the Polarity Selector 59 to determine whether the Polarity Selector 59 selects the inverted or noninverted output of the Polarity Divider 54. The output of the Polarity Selector 59 is the waveform shown in FIG. 3F, which is the same waveform produced by the Data Modulator 6 in the encoder. Accordingly, at this stage in the descrambling process, the scrambled and encoded video signal is almost completely unscrambled, although it still has the synthetic sync pulses modulated with the data identifying the scrambling sequence, at the locations where the original horizontal blanking and sync pulses have been biased.

The output of the Polarity Selector 59 drives the Sync Debias circuit 60, which is also driven by the output of the Fixed Sync Debias Sequence Generator 81 which is triggered by detecting the normal sync to debias the biased horizontal information in the waveform. The output of the Sync Debias circuit 60 is shown in FIG. 3L. The output of the Fixed Sync Debias Sequence Generator 81 is a negative going pulse which is superimpiosed on the waveform shown in FIG. 3F, to produce the waveform whown in FIG. 3L. The locations at which this waveform is supplied are determined by the Fixed Sync Debias Generator 81.

The output of the Sync Debias circuit 60 is connected to a Sync Shaper circuit 63, whose function it is to maintain a uniform amplitude for the sync pulses. As shown in FIG. 3L, the sync pulses produced by the Sync Debias circuit 60 are still amplitude-modulated. The Sync Shaper circuit 63 clamps the amplitude of the sync pulses shown in FIG. 3L to a uniform level. The output of the Sync Shaper 63 is the completely unscrambled original composite video waveform shown in FIG. 3A. This waveform is then passed to the modulation circuit 65, which produces a signal receivable over selected channels of a television set. In FIG. 2, the modulator is shown having an output between channels 3 and 4.

Synchronization of the decoder circuit is maintained by Normal Sync Separator circuit 66, which processes the vertical sync pulses and the non-biased horizontal synthronization and blanking pulses to provide a clock basis for the system.

In addition to its decoding functions, the decoder may be equipped with other functional blocks such as a digital clock or with a digital decode circuit designed to display certain of the information encoded onto the scrambled waveform by the encoder circuit, so as to allow the television receiver to be used as a video printer.

As is apparent from the foregoing description of the scrambling and descrambling sequences, the present invention also provides a novel method to scramble and descramble a composite video signal.

In the foregoing description of the present invention, a preferred embodiment of the invention has been disclosed. It is to be understood that other design modifications are within the scope of the present invention and that the present invention is not limited to the particular embodiment which has been disclosed and discussed in detail herein.

What is claimed is:

1. A system for dynamically scrambling and descrambling a composite video signal having video program information and horizontal sync and blanking signals, comprising:

bias means for selectively DC biasing said sync and blanking signals according to a first predefined fixed sequence, and for imposing, at the locations of said biased sync and blanking signals, a synthetic sync signal;

information modulating means for modulating said synthetic sync signal with binary information identifying the inversion sequence of video signal;

inversion means for selectively inverting, according either a second predefined fixed sequence or a random sequence, selected portions of said video program informations, said horizontal sync signals, said horizontal blanking signals, and said synthetic sync signals in said encoded video signal to produce a scrambled encoded video signal;

information detecting means for detecting said encoded information in said scrambled encoded video signal to identify said inversion sequence of video signal;

reinversion means for selectively reinverting, according to said first and second predefined sequences, the inverted portions of said video program information, said horizontal sync signals, said horizontal blanking signals, and said synthetic sync signals in said scrambled encoded video signal to produce an unscrambled encoded video signal; and restoration means for removing said synthetic sync signals from said encoded video signal and to restore said biased sync and blanking signals, whereupon said composite video signal is restablished.

2. A system as defined in claim 1, wherein said bias means comprises:

adding means for adding to said composite video signal pulses of opposite polarity and larger amplitude than said horizontal sync and blanking signals, said synthetic sync signal comprising the sum of said pulses and said horizontal sync and blanking signals; and fixed generator means for generating said pulses in a fixed sequence.

3. A system as defined in claim 1, wherein:
said information modulating means comprises pulse amplitude modulating means.

4. A system as defined in claim 1, wherein:
said information modulating means comprises pulse width modulating means.

5. A system as defined in claim 1, wherein:
said information modulating means comprises shift keying means.

6. A system as defined in claim 1, wherein:
said bias means is coupled to said composite video signal;
said inversion means is coupled to said information modulating means;

said system further comprises radio frequency modulation means, coupled to said inversion means, for transmitting said scrambled encoded signal;

said system further comprises radio frequency demodulating means for demodulating said transmitted signal to produce said scrambld encoded signal;

said information detecting means is coupled to said radio frequency demodulating means;

said reinversion means is coupled to said information detecting means; and said restoration means is coupled to said reinversion means.

7. A system as defined in claim 1, wherein said inversion means comprises:

polarity divider means for producing inverted and noninverted versions of said encoded video signal;

polarity selection means for selecting either said inverted or noninverted encoded video signal;

inversion generator means, coupled to said selection means, for controlling said selection made by said polarity selection means;

sync control means for generating signals requiring the inversion of said horizontal sync and blanking signals and said synthetic sync signals in a fixed sequence;

first video control means for generating signals requiring the inversion of said video program information in a fixed sequence;

second video control means for generating signals requiring the inversion of said video program information in a random sequence;

third video control means for generating signals requiring the inversion of said video infoormation in accordance with the mean value of the color level in said video program information; and video polarity selector means, coupled to said first, second, and third video control means and to said inversion generator means, for selectably coupling one of said video control means to said inversion generator means to control said inversion of said video program information.

8. A system as defined in claim 7, wherein said third video control means comprises:

chrominance filter means for filtering said chrominance information from said composite video signal;

color level detector and storage means for detecting and storing the mean value of said chrominance information in successive frames of said composite video signal;

chrominance comparator means for comparing said stored mean values of said color information; and primary color decoder means for decoding primary color information from composite video signal.

9. A system as defined in claim 1, wherein said system further comprises:

sync separation means, coupled to said composite video signal, for separating said sync signals from said composite video signal to establish a clocking signal for said system.

10. A system as defined in claim 1, wherein said reinversion means comprises:

polarity divider means for producing inverted and noninverted versions of said scrambled encoded video signal; and polarity selection means for selecting said inverted or said noninverted version according to said sequence, thereby producing an unscrambled signal.

11. A system as defined in claim 1, wherein said restoration means comprises:

sync reinverting means for reinverting said synthetic sync signals; and sync shaping means for removing said information modulation in said synthetic sync singals.

12. A method for scrambling and descrambling a composite video signal having video program information and horizontal blanking and sync pulses, comprising:

establishing different sequences for selectively inverting said video program information and said horizontal blanking and sync pulses;

biasing, according to a first predefined fixed sequence, selected ones of said horizontal sync and blanking pulses, and imposing, above the biased sync pulses, a synthetic sync pulse;

modulating said synthetic sync pulses with binary information identifying the inversion sequence of video signal;

inverting said sync pulses according to a second predefined fixed sequence;

selectively inverting, according to said two sequences, said video program information, the nonbiased horizontal sync and blanking pulses, and said synthetic pulses, thereby producing a scrambled composite video signal encoded with said sequence;

detecting said sequence in said scrambled and encoded composite video signal;

selectively reinverting, according to said two sequences, said video program information, said noninverted horizontal sync and blanking pulses, and said synthetic sync pulses, thereby producing a descrambled composite video signal encoded with said sequence; and debiasing said biased horizontal sync and blanking pulses, thereby removing said synthetic sync pulses encoded with said sequence and producing said composite video signal.

* * * * *